(12) United States Patent
Coleman et al.

(10) Patent No.: US 9,141,332 B2
(45) Date of Patent: Sep. 22, 2015

(54) MASKING SENSITIVE INFORMATION IN A SCREEN SHARING SESSION

(75) Inventors: Barry Gordon Coleman, San Jose, CA (US); Keith Speers, Newtownabbey (GB)

(73) Assignee: Oracle OTC Subsidiary LLC, Redwood Shores, CA (US)

( * ) Notice: Subject to any disclaimer, the term of this patent is extended or adjusted under 35 U.S.C. 154(b) by 11 days.

(21) Appl. No.: 13/179,706

(22) Filed: Jul. 11, 2011

(65) Prior Publication Data

US 2012/0036452 A1 Feb. 9, 2012

Related U.S. Application Data

(60) Provisional application No. 61/371,953, filed on Aug. 9, 2010.

(51) Int. Cl.
*G06F 3/048* (2013.01)
*G06F 3/14* (2006.01)
*G06F 21/55* (2013.01)

(52) U.S. Cl.
CPC ............. *G06F 3/1462* (2013.01); *G06F 21/55* (2013.01); *G06F 2221/032* (2013.01); *G09G 2370/027* (2013.01)

(58) Field of Classification Search
CPC ... G06Q 10/10; G06Q 10/109; G06Q 10/107; G06F 3/0481; H04L 12/1822
USPC ...................................................... 715/751
See application file for complete search history.

(56) References Cited

U.S. PATENT DOCUMENTS

| | | | | |
|---|---|---|---|---|
| 5,107,443 A | * | 4/1992 | Smith et al. ................... | 715/751 |
| 5,262,761 A | * | 11/1993 | Scandura et al. ............. | 345/581 |
| 6,128,010 A | * | 10/2000 | Baxter et al. .................. | 715/846 |
| 6,744,452 B1 | * | 6/2004 | McBrearty et al. ........... | 715/853 |
| 7,168,048 B1 | * | 1/2007 | Goossen et al. .............. | 715/797 |
| 7,533,345 B2 | * | 5/2009 | Krebs ........................... | 715/745 |
| 2006/0168533 A1 | * | 7/2006 | Yip et al. ....................... | 715/753 |
| 2008/0002911 A1 | * | 1/2008 | Eisen et al. ................... | 382/283 |
| 2008/0208579 A1 | * | 8/2008 | Weiss et al. ................... | 704/244 |
| 2009/0089663 A1 | * | 4/2009 | Rebstock et al. ............. | 715/253 |
| 2010/0131868 A1 | * | 5/2010 | Chawla et al. ................ | 715/759 |
| 2011/0239113 A1 | * | 9/2011 | Hung et al. .................... | 715/271 |
| 2012/0011451 A1 | * | 1/2012 | Bansal et al. ................. | 715/753 |
| 2012/0033852 A1 | * | 2/2012 | Kennedy et al. .............. | 382/103 |

OTHER PUBLICATIONS

"Masking sensitive data prior to logging", http://www.ibm.com/developerworks/forums/thread.jspa?threadID=187004, Dec. 11, 2007.*
Wikipedia page, "Data scraping," http://en.wikipedia.org/wiki/Data_scraping, pgs. 1-3, Jul. 5, 2011.

(Continued)

*Primary Examiner* — Jennifer To
*Assistant Examiner* — Joseph R Burwell
(74) *Attorney, Agent, or Firm* — Miles & Stockbridge PC

(57) ABSTRACT

A system can mask specific components of an application, such as a web page, displayed during a screen sharing session. As the web page is being displayed on a first computer screen (i.e., screen), the system can automatically mask specific components of the web page. Thus, when the first screen is captured, and the capture is transmitted to a second screen, the specific components of the web page that have been masked will not be displayed at the second screen.

20 Claims, 8 Drawing Sheets

(56) References Cited

OTHER PUBLICATIONS

WebEx Meeting Center FAQ page, https://welcome.webex.com/docs/T26L/pt/mc08001/en_US/support/faq.htm#doc_app_difference, pp. 1-6, Nov. 2007.
Livelook—FAQ, http://www.livelook.com/faq.asp, pp. 1-2, Feb. 2, 2011.
Livelook—Screen Sharing, http://livelook.com/screen_sharing.asp, pp. 1-2, Feb. 2, 2011.
Livelook—Co-Browsing, http://www.livelook.com/co_browsing.asp, pp. 1-2, Feb. 2, 2011.
GoToMeeting—Features, http://www.gotomeeting.com/fec/online_collaboration, pp. 1-5, Feb. 2, 2011.

* cited by examiner

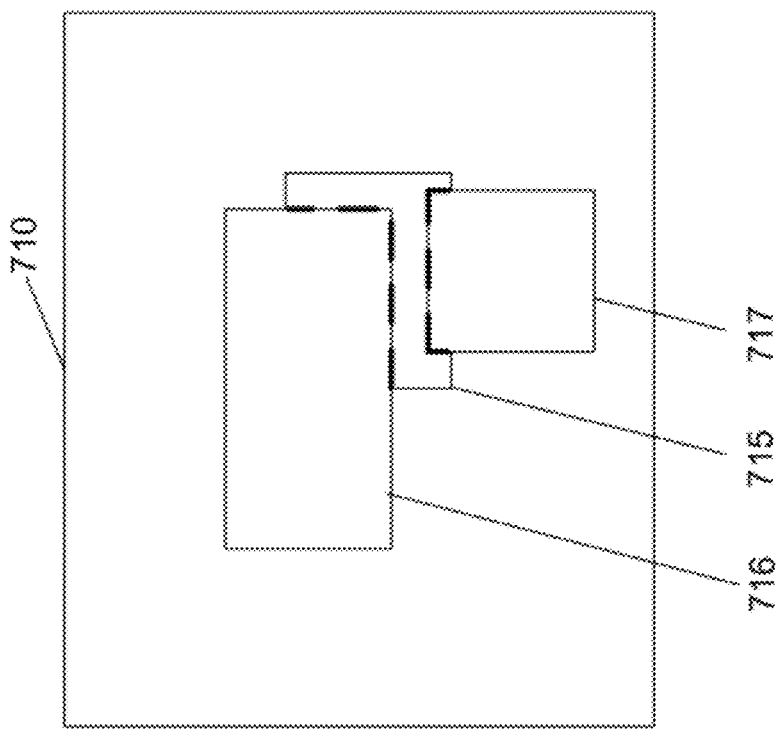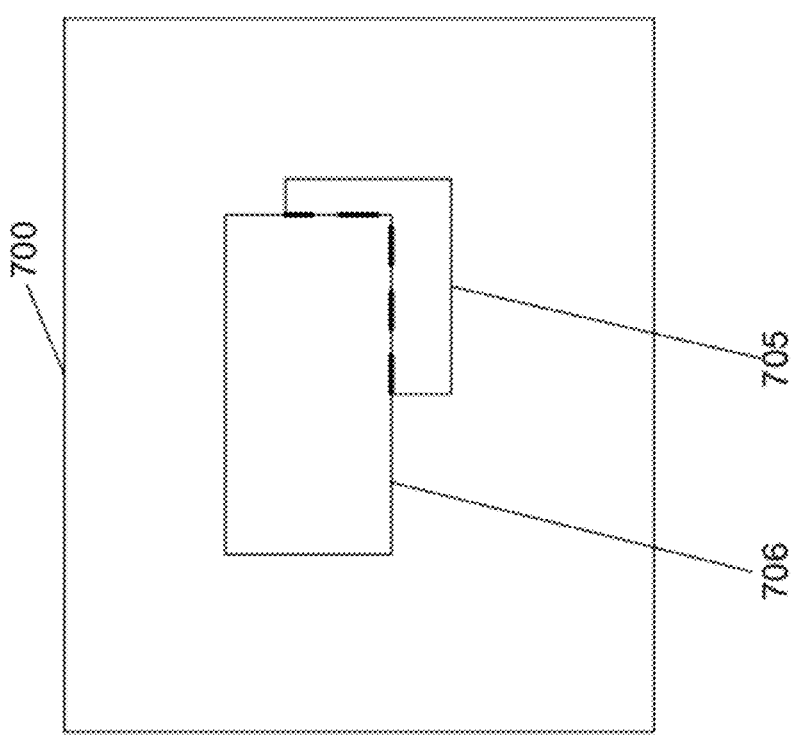
Fig. 7

MASKING SENSITIVE INFORMATION IN A SCREEN SHARING SESSION

CROSS-REFERENCE TO RELATED APPLICATIONS

This application claims priority of U.S. Provisional Patent Application Ser. No. 61/371,953, filed on Aug. 9, 2010, the subject matter of which is hereby incorporated by reference.

FIELD

One embodiment is directed to a computer system, and more particularly, to remote access to the computer system and screen sharing of the computer system.

BACKGROUND

During an action of supporting a customer using an application, such as a web page, a customer service representative or agent may request to initiate a screen sharing session with the customer. A screen sharing session is a session where a software application captures an individual's screen, and transmits the capture to a screen of a second individual. The capture can be accomplished using a software application that can be downloaded to a desktop of the customer. Thus, based on the capture, the second individual sees exactly what the first individual sees.

For example, an agent may receive a telephone call from a customer, where the customer is indicating a problem entering information into a web page, and the agent may request that the customer share his screen with the agent, so the agent can view the customer attempt to enter information into the web page. As another example, a client may initiate an instant messaging session with the agent using his desktop, rather than telephoning the agent, where the customer can also indicate a problem with the web page by entering a message in a dialog box displayed to the customer. The agent can have a corresponding dialog box displayed on the agent's screen, and similar to the telephone example, the agent may request that the customer share his screen with the agent.

SUMMARY

One embodiment is directed to a computer-readable medium having instructions stored thereon that, when executed by a processor, cause the processor to mask components of an application displayed during a screen sharing session. The instructions include capturing a display of a first screen, which includes a display of the application. The instructions further include identifying a component of the application with a masking indication. The instructions further include masking the component of the application identified with the masking indication, so that the component of the application identified with the masking indication is not visible. The instructions further include transmitting the captured display to a second screen. The instructions further include displaying the captured display at the second screen, wherein the component of the application identified with the masking indication is not visible in the captured display displayed at the second screen.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 7 illustrates additional examples of masking borders according to an embodiment of the invention.

DETAILED DESCRIPTION

Figure 1:
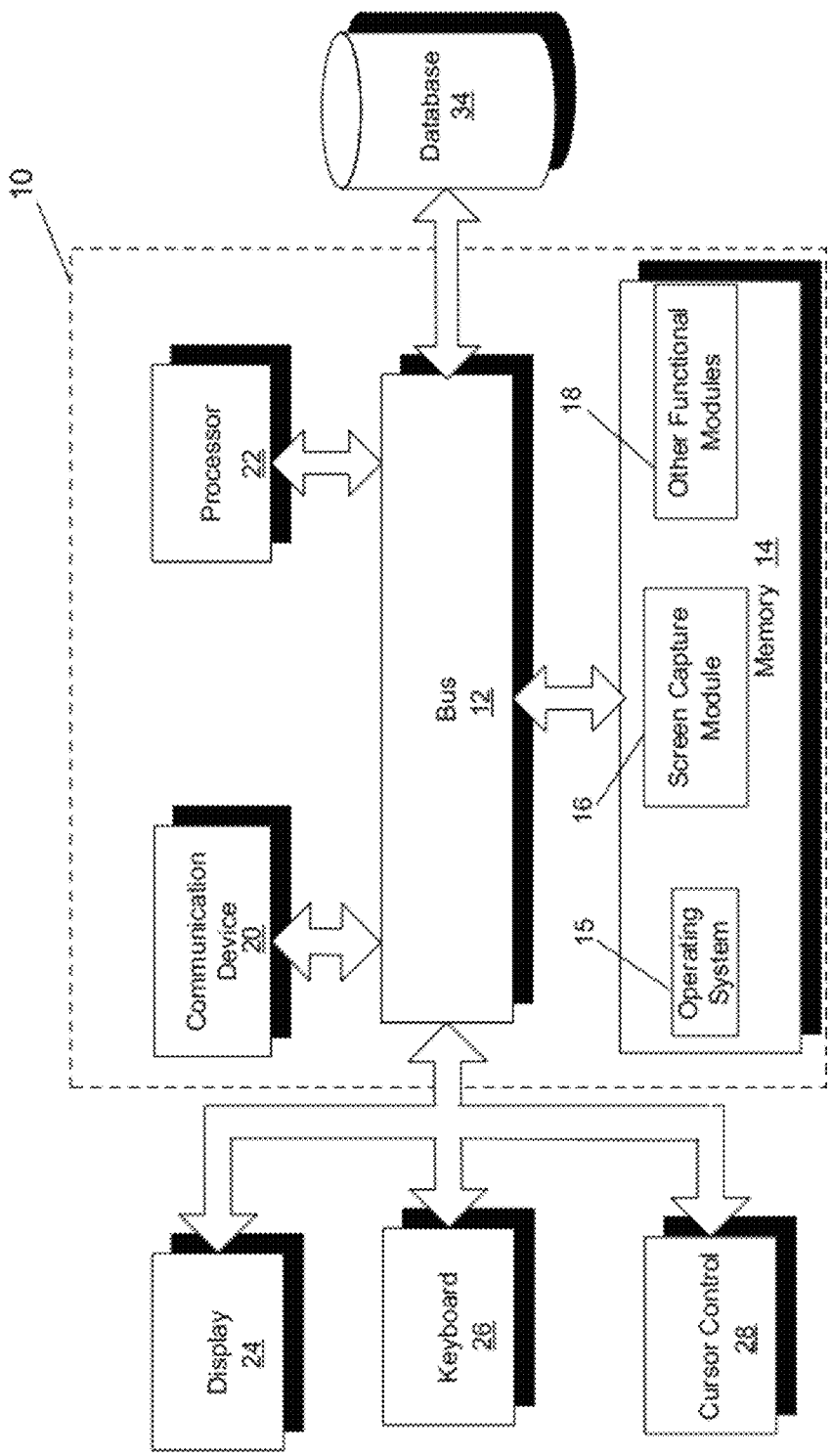
FIG. 1 illustrates a block diagram of a system that may implement an embodiment of the invention.

According to an embodiment, a system can mask specific components of an application, such as a web page, displayed during a screen sharing session. As the web page is being displayed on a first computer screen (i.e., screen), the system can automatically mask specific components of the web page. Thus, when the first screen is captured, and the capture is transmitted to a second screen, the specific components of the web page that have been masked will not be displayed at the second screen. In one embodiment, the capture can be transmitted to other screens in addition to the second screen, where the specific components of the web page that are masked are not displayed at each of the other screens.

As previously described, during an action of supporting a customer using an application, such as a web page, an agent may request to initiate a screen sharing session with the customer, and have the customer share his screen with the agent, where the screen that is displayed to the customer is also displayed to the agent. However, in a traditional screen sharing session, an agent can often see the entire screen of the customer, and it is often desirable to be able to restrict the area visible to the agent to only the web browser, or other application window that displays the application. Even when the agent can only see the web browser, or application window, it is often desirable that some areas of the web page, or other application, be masked from the view of the agent. These areas, such as fields, may contain sensitive data, such as social security numbers, credit card details, or confirmation codes, that the customer does not wish to share with the agent. Thus, according to the embodiment, an application displayed on a first screen can also be displayed on a second screen during a screen sharing session, with specific components of the application masked within the second screen, as will be described in greater detail. In other embodiments, the application displayed on the first screen can also be displayed on other screens in addition to the second screen during the screen sharing session, with specific components of the application masked within each other screen, as will also be described in greater detail.

As understood by one of ordinary skill in the art, an application is a type of computer software designed to help a user of the application perform a specific task or multiple related specific tasks when executed by a processor. In general, an application includes a user interface that is displayed on a screen, and that is designed to allow a user to interact with the application and view data output by the application. As one of ordinary skill in the art would also appreciate, one type of application is a web page. A web page is a resource that can be accessed through a web browser and be displayed on a screen. A web page can be comprised of files containing static text and other content stored within a web server's file system, or can be constructed by server-side computer software when they are requested. A web page generally includes a markup language designed to interpret content of the web page, such as HyperText Markup Language ("HTML") or Extensible Hypertext Markup Language ("XHTML"), and a style sheet designed to provide layout, typographic, and color information.

As will be described in greater detail, in certain embodiments, certain features of the invention are specific to applications that are web pages. In other embodiments, certain features of the invention are specific to applications that are software applications. In yet other embodiments, certain features apply to both types of applications. Therefore, unless specifically stated otherwise, a feature described in this specification applies to any type of application.

As also understood by one of ordinary skill in the art, in one embodiment, a component of an application can be an area of the application that is displayed on a screen. For example, in an embodiment where an application is a web page, a component can be a field, a form field, a button, an image, a hyperlink, or any element of the web page that is displayed in a screen. In an embodiment where an application is a software application, a component can be a field, a form field, a button, an image, a cell, or any element of the software application that is displayed in a screen. In another embodiment, a component of an application can be an area of an application displayed on a screen, where the area of the application displayed on the screen is captured within a multimedia format. Thus, any reference to "masking a component" or "masking components" within this specification can either refer to masking an area of an application displayed on a screen, or masking an area of a multimedia format where an area of an application displayed on a screen is captured. The capturing of the area of the application displayed on the screen within a multimedia format, and the multimedia format, are discussed in greater detail in relation to FIGS. 4 and 5.

FIG. 1 illustrates a block diagram of a system 10 that may implement one embodiment of the invention. System 10 includes a bus 12 or other communication mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communication interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a screen capture module 16, as well as other functional modules 18. Operating system 15 can provide an operating system functionality for system 10. Screen capture module 16 can provide functionality for masking components of an application that is displayed during a screen sharing session, as will be described in more detail below. System 10 can also be part of a larger system. Thus, system 10 can include one or more additional functional modules 18 to include the additional functionality. For example, functional modules 18 may include modules that are part of a Commerce Service Center product from Art Technology Group, Inc.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
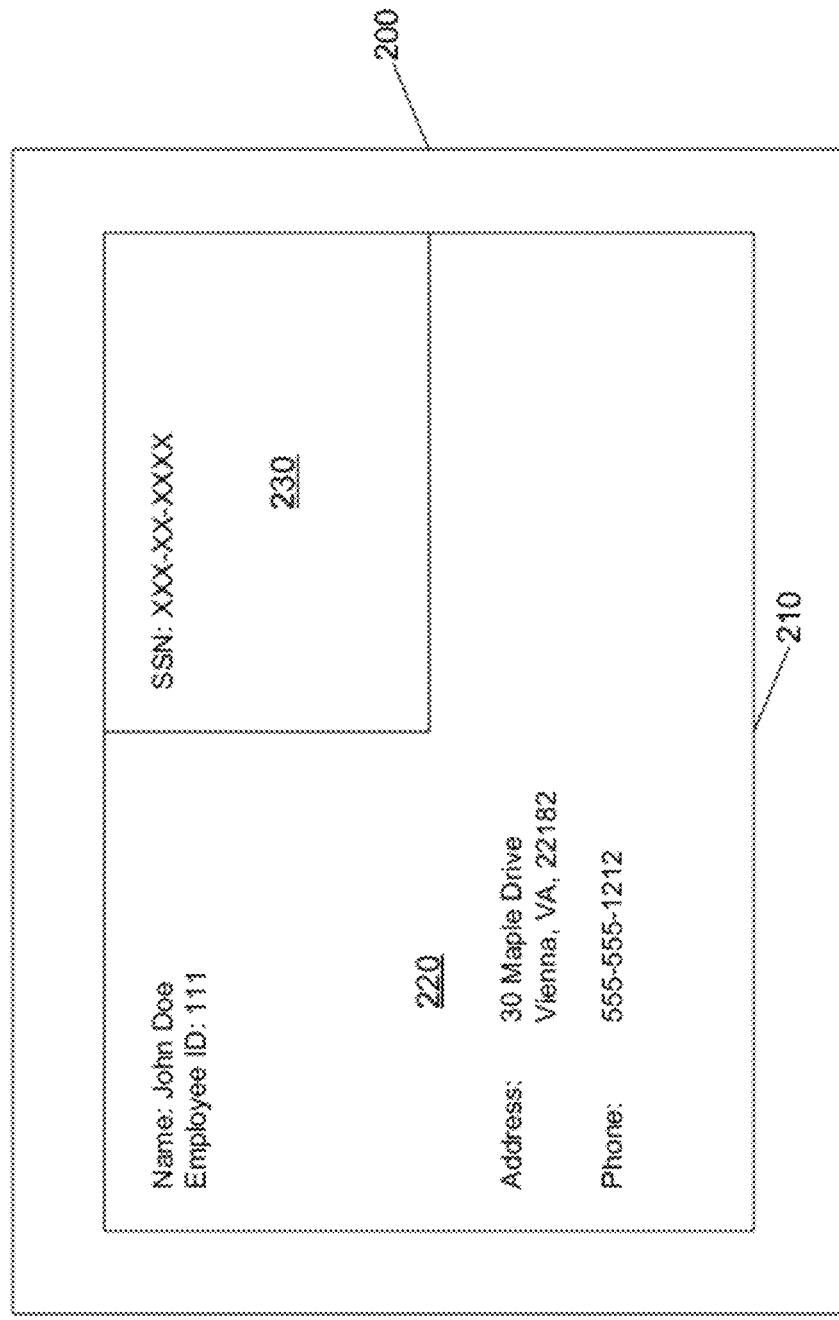
FIG. 2 illustrates an application that includes multiple components, displayed on a screen, according to an embodiment of the invention.

FIG. 2 illustrates an application 210 that includes multiple components, displayed on a screen 200, according to an embodiment of the invention. More specifically, as illustrated in FIG. 2, screen 200 can be any type of computer screen or display device known to one of ordinary skill in the art, such as an LCD. Screen 200 can be operatively coupled to a computer (not shown in FIG. 2), where a computer can be any programmable machine known to one of ordinary skill in the art that includes a processor and a computer-readable medium. As also illustrated in FIG. 2, application 210, which can be any type of application known to one of ordinary skill in the art, such as a web page or software application, includes components 220 and 230. As previously described, in one embodiment, components 220 and 230 are areas of application 210 that are displayed on screen 200. In another embodiment, components 220 and 230 are areas of application 210 that are displayed on screen 200, where the areas of application 210 that are displayed on screen 200 are captured within a multimedia format. While in the illustrated embodiment in FIG. 2, application 210 includes two components (i.e., components 220 and 230), one of ordinary skill in the art would readily appreciate that this is merely an example embodiment. In alternate embodiments, application 210 can include any number of components.

According to an embodiment of the invention, specific components of an application can be identified with a visible indication, where a visible indication is an indication that indicates the specific components are to be visible during a screen sharing session. For example, a border of each component that is to be visible may be set to a visible color, such as blue, where a visible color is a color that indicates the component is to be visible during a screen sharing session. Thus, during a screen sharing session, each component with a border of a visible color can be displayed on another screen when the application is displayed on another screen. According to an embodiment, a visible indication, such as a border of a visible color, can indicate to a screen capture module (such as screen capture module 16 of FIG. 1), that captures and transmits the display of the application, to display the component on the other screen.

Also according to the embodiment, other specific components of the application can be identified with a masking indication, where a masking indication is an indication that indicates the specific components are not to be visible (i.e., are to be masked) during a screen sharing session. For example, a border of each component that is not to be visible may be set to a masking color, such as red, where masking color is a color that indicates the component is not to be visible (i.e., is to be masked) during a screen sharing session. Thus, during a screen sharing session, each component with a border of a masking color can be masked on another screen when the application is displayed on the other screen. In one embodiment, by being masked, each component can be replaced with a solid color or pattern, rendering the component invisible when the application is displayed on the other screen. According to an embodiment, a masking indication, such as a border of a masking color, can indicate to a screen capture module (such as screen capture module 16 of FIG. 1) to mask the component.

In an alternate embodiment, by being masked, text, icons, objects, or other types of content in each component can be changed to match the color of the background color of the component. In embodiments in which the component includes text of a known color that can be entered by a user, all pixels of the known text color and colors "close" to the known text color can be replaced with pixels of the background color. In this context, "close" means that the color merely differs from the known text color in amount that would be expected to result from compression, or anti-aliasing techniques. In certain embodiments, this color distance is represented by a defined number of least significant bits (e.g., two least significant bits) of components of a color. For example, in an 24-bit red-green-blue ("RGB") scheme, where colors are represented as red, green, and blue components with eight bits of resolution for each component, where a known text color is a bright green (i.e. has a RGB value of 0x00fd00), then pixels of any color within two least significant bits (e.g., 0x00ff00, 0x00fe00, 0x00fc00, 0x00fb00, 0x02fd00, 0x01fd00, 0x00fd02, 0x00fd01, 0x01fd01, 0x02fd02, 0x01fd02, and 0X02fd01) would be considered "close" to the known text color, and can be replaced with pixels of the background color.

For example, according to the illustrated embodiment in FIG. 2, component 220 can be a component that is to be visible during a screen sharing session, and component 230 can be a component that is to be masked during a screen sharing session. In the illustrated embodiment, component 220 displays name data, employee identity data, address data, and phone data, and thus, component 220 includes data that can be visible during a screen sharing session. Also in the illustrated embodiment, component 230 displays social security data (represented by "XXX-XX-XXXX"), which can be identified as confidential data, and thus, component 230 includes data that can be masked during a screen sharing session. This is merely an example embodiment, and in alternate embodiments, a component that is to be visible during a screen sharing session can include any type of data, and a component that is to be masked during a screen sharing session can also include any type of data.

According to the illustrated embodiment in FIG. 2, in order to identify that component 220 is to be visible during a screen sharing session, component 220 is identified with a visible indication. For example, a border of component 220 is set to a visible color, such as blue (not shown in FIG. 2). In an embodiment, the border is displayed in screen 200. In order to identify that component 230 is to be masked during a screen sharing session, according to the illustrated embodiment, component 230 is identified with a masking indication. For example, a border of component 230 is set to a masking color, such as red (not shown in FIG. 2). In an embodiment, the border is also displayed in screen 200. According to an embodiment, any border that is shared by component 220 and component 230 can be identified with both a first and a masking indication, so that the border is identifiable as a border of both component 220 and component 230. Thus, according to the embodiment, a screen capture module (such as screen capture module 16 of FIG. 1) can determine that, when the display of application 210 on screen 200 is to be captured and transmitted to another screen, component 220 should be displayed on the second screen, and component 230 should be masked.

While in the illustrated embodiment of FIG. 2, application 210 includes one component (i.e., component 220) with a visible indication, and one component (i.e., component 230) with a masking indication, this is merely an example embodiment. In alternate embodiments, application 210 can include any number of components with a visible indication, and any number of components with a masking indication. In one embodiment, application 210 can only include one or more components with a masking indication. In addition, while in the above example, two indications are used, there is also merely an example embodiment, and in alternate embodiment, any number of indications can be used. In one alternate embodiment, only one or more masking indications can be used.

According to an embodiment of the invention, a screen capture module (such as screen capture module 16 of FIG. 1) can dynamically identify components of an application (such as component 220 of application 210) with a visible indication, and dynamically identify other components of the application (such as component 230 of application 210) with a masking indication. In an embodiment where the application is a web page, the screen capture module can utilize source code written in a scripting language for the dynamic identification of components of an application.

As part of the dynamic identification of components of a web page, the source code can dynamically determine components to be displayed during a screen sharing session, and components to be masked during the screen sharing session. According to the embodiment, the source code can apply a set of configurable rules to dynamically determine whether a component is to be displayed or masked during a screen sharing session. The set of configurable rules can include one or more sets of elements, such as component class name, component identity, or component path. The one or more sets of elements can identify whether each element should be displayed or masked during a screen sharing session. According to the embodiment, the source code can analyze a document object model ("DOM") of the web page and determine whether each component of the web page is an element that should be displayed during a screen sharing session, or whether the component is an element that should be masked during the screen sharing session. The set of configurable rules can be configured at runtime by editing the one or more sets of elements, which can be done utilizing an administration module.

Also as part of the dynamic identification of components of a web page, the source code can also dynamically modify the web page to identify components to be displayed during a screen sharing session with a visible indication, and to identify components to be masked during the screen sharing session with a masking indication. According to the embodiment, the source code can dynamically modify the web page by dynamically modifying a style sheet of the web page. As one of ordinary skill in the art would understand, a style sheet can be used to define a visual layout (i.e., style) of a web page. A style sheet can comprise an external style sheet file that utilizes a style sheet language, such as Cascading Style Sheets ("CSS") or Extensible Stylesheet Language ("XSL"). Thus, according to the embodiment, the source code can dynamically modify the style sheet of the web page to identify components to be displayed during a screen sharing session with a visible indication, and to identify components to be masked during the screen sharing session with a masking indication. As an example, the source code can dynamically modify the style sheet of the web page to display components that are to be displayed during a screen sharing session with a border of a visible color. In the example, the source code can also dynamically modify the style sheet of the web page to display components that are to be masked during a screen sharing session with a border of a masking color.

According to this embodiment, the source code can be included in one or more tags that are inserted within the web page, where the one or more tags can automatically load the source code. Once loaded, the source code can dynamically identify components and dynamically modify the web page as previously described. In an embodiment, the source code can be written in a JavaScript scripting language.

In an alternate embodiment where the application is a software application, the screen capture module can utilize source code written in the native language of the software application for the dynamic identification of components of the software application.

As part of the dynamic identification of components of a software application, the source code can dynamically determine components to be displayed during a screen sharing session, and components to be masked during the screen sharing session. According to the embodiment, the source code can apply a set of configurable rules to dynamically determine whether a component is to be displayed or masked during a screen sharing session. The set of configurable rules can include one or more sets of elements, such as component class name, component identity, or component path. The one or more sets of elements can identify whether each element should be displayed or masked during a screen sharing session. According to the embodiment, the source code can analyze source code of the software application and determine whether each component of the software application is an element that should be displayed during a screen sharing session, or whether the component is an element that should be masked during the screen sharing session. The set of configurable rules can be configured at runtime by editing the one or more sets of elements, which can be done utilizing an administration module.

Also as part of the dynamic identification of components of a software application, the source code can also dynamically modify the software application to identify components to be displayed during a screen sharing session with a visible indication, and to identify components to be masked during the screen sharing session with a masking indication. According to the embodiment, the source code can dynamically modify the software application by dynamically modifying one or more attributes of the software application. As one of ordinary skill in the art would understand, an attribute is a specification within the software application that defines a property, or value, of an object, such as a component. An example of an attribute is a display property that defines how an object, such as a component, is displayed. Thus, according to the embodiment, the source code can dynamically modify the one or more attributes of the software application to identify components to be displayed during a screen sharing session with a visible indication, and to identify components to be masked during the screen sharing session with a masking indication. As an example, the source code can dynamically modify attributes of the software application to display components that are to be displayed during a screen sharing session with a border of a visible color. In the example, the source code can also dynamically modify the attributes of the software application to display components that are to be masked during a screen sharing session with a border of a masking color. According to this embodiment, an application programming interface ("API") of the software application can be extended to allow the source code to interact with the source code of the software application and modify the one or more attributes of the software application.

According to an alternate embodiment of the invention, a third party (such as an owner or developer of an application) can manually identify components of the application (such as component 220 of application 210) with a visible indication, and manually identify other components of the application (such as component 230 of application 210) with a masking indication. In an embodiment where the application is a web page, the third party can manually determine components to be displayed during a screen sharing session, and components to be masked during the screen sharing session. According to the embodiment, the third party can manually modify a style sheet of the web page to identify components to be displayed during a screen sharing session with a visible indication, and to identify components to be masked during the screen sharing session with a masking indication. As an example, similar to the example described above, the third party can manually modify the style sheet of the web page to display components that are to be displayed during a screen sharing session with a border of a visible color. In the example, the third party can also manually modify the style sheet of the web page to display components that are to be masked during a screen sharing session with a border of a masking color.

In an alternate embodiment where the application is a software application, the third party can manually determine components to be displayed during a screen sharing session, and components to be masked during the screen sharing session. According to the embodiment, the third party can manually modify one or more attributes of the software application to identify components to be displayed during a screen sharing session with a visible indication, and to identify components to be masked during the screen sharing session with a masking indication. In the above example, the third party can manually modify the attributes of the software application to display components that to be displayed during a screen sharing session with a border of a visible color. In the example, the third party can also manually modify the attributes of the software application to display components that are to be masked during a screen sharing session with a border of a masking color.

Figure 3:
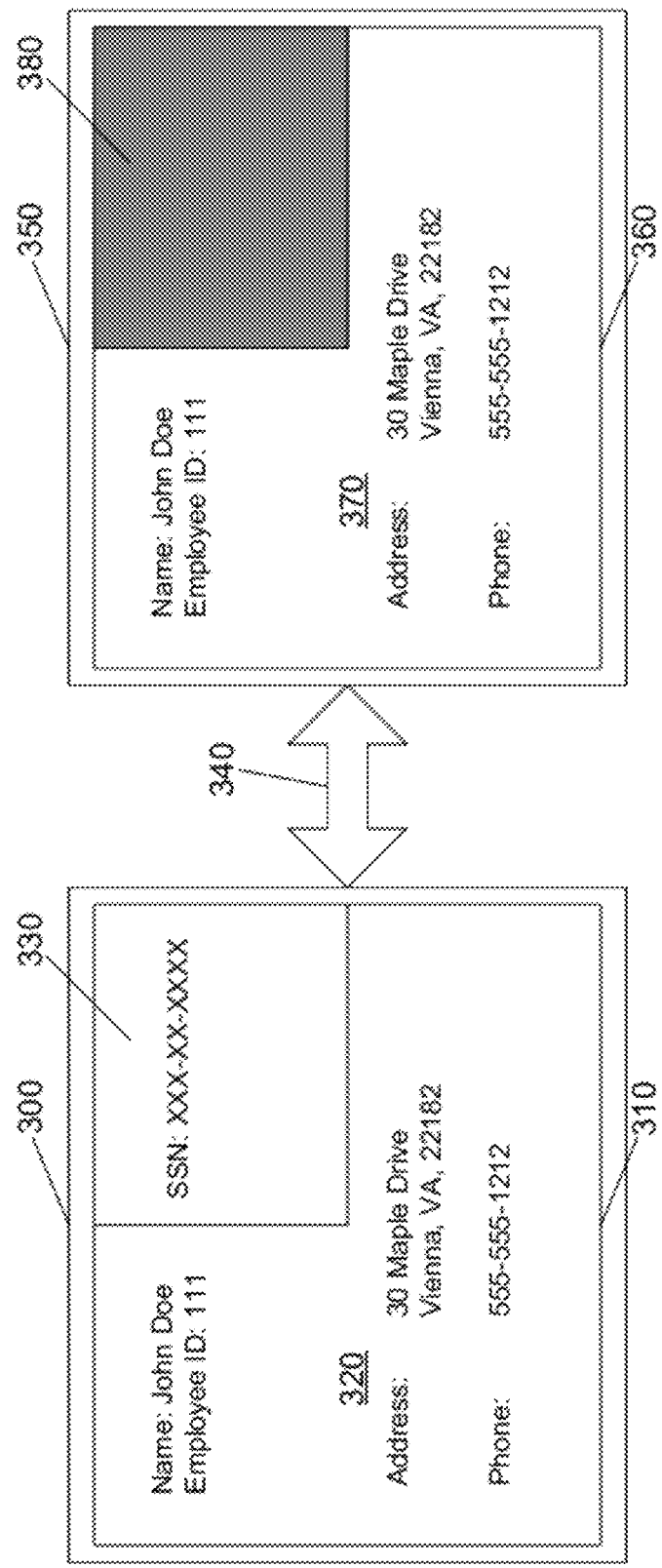
FIG. 3 illustrates a screen sharing session where a component of an application displayed on a first screen is visible when displayed on a second screen, and another component of the application displayed on the first screen has been masked when displayed on the second screen, according to an embodiment of the invention.

FIG. 3 illustrates a screen sharing session where a component 320 of an application 310 displayed on a first screen 300 is visible when displayed on a second screen 350, and another component 330 of application 310 displayed on first screen 300 is masked when displayed on second screen 350, according to an embodiment of the invention. More specifically, FIG. 3 illustrates two screens, first screen 300 and second screen 350, that are involved in a screen sharing session. While the illustrated embodiment of FIG. 3 illustrates two screens that are involved in a screen sharing session, in alternate embodiments, additional screens can be involved in a screen sharing session. In these alternate embodiments, component 320 of application 310 is visible when displayed on each additional screen, and component 330 of application 310 is masked when displayed on each additional screen. First screen 300 displays application 310, which is comprised of two components, component 320 and component 330. Similar to the illustrated embodiment of FIG. 2, component 320 displays name data, employee identity data, address data, and phone data, and thus, component 320 includes data that can be visible during the screen sharing session. Also similar to the illustrated embodiment of FIG. 2, component 330 displays social security data (represented by "XXX-XX-XXXX"), which can be identified as confidential data, and thus, component 330 includes data that can be masked during a screen sharing session. FIG. 3 also illustrates connection 340. Connection 340 can be any type of data connection known to one of ordinary skill in the art, such as a wired network connection or a wireless network connection. Connection 340 can be a direct connection or an indirect connection. Connection 340 facilitates a screen sharing session, by capturing the display of first screen 300, which includes the display of application 310, into a multimedia format and transmitting the multimedia format to second screen 350. Connection 340, the capturing and transmitting facilitated by connection 340, and the multimedia format, are discussed in greater detail in relation to FIGS. 4 and 5.

According to the embodiment, second screen 350 receives the multimedia format from first screen 300 and displays the multimedia format as multimedia format 360. As illustrated in FIG. 3, component 320 is visible in multimedia format 360 as visible component 370. Furthermore, as also illustrated in FIG. 3, component 330 is masked in multimedia format 360 as masked component 380. In the illustrated embodiment of FIG. 3, the text of component 320 is visible in visible component 370, and the text of component 330 is replaced in masked component 380 with a solid color. Of course, the replacement of the text of component 330 with a solid color is only an example of masking, and, in alternate embodiment, component 330 can be masked by replacing the text of component 330 with any solid color or pattern, or by changing the text of component 330 to match the color of the background color of component 330, as previously described.

As previously described, a connection, such as connection 340 illustrated in FIG. 3, facilitates a screen sharing session between two screens by capturing the display of the first screen into a multimedia format and transmitting the multimedia format to the second screen. As also previously described, the connection can be a direct connection or indirect connection. The type of connection can depend upon whether the screen sharing session utilizes a peer-to-peer model or an intermediary server model. Both models will now be described in greater detail.

Figure 4:
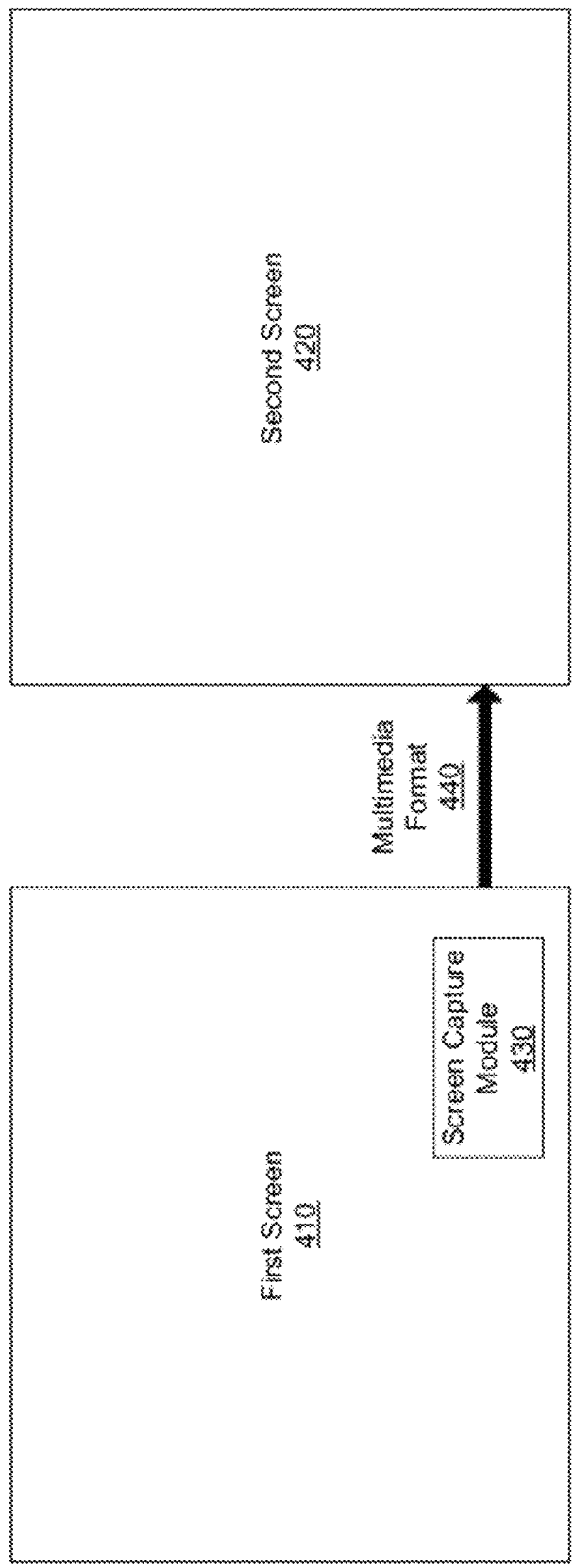
FIG. 4 illustrates a peer-to-peer screen sharing session according to an embodiment of the invention.

FIG. 4 illustrates a peer-to-peer screen sharing session according to an embodiment of the invention. According to the embodiment, FIG. 4 includes a first screen 410. As an example, first screen 410 can be a screen of a customer used to display an application, such as a web page or a software application. According to the embodiment, the customer can initiate a screen sharing session with a second screen 420. As an example, second screen 420 can be a screen of a customer server agent, and the customer can initiate a screen sharing session with the agent, so that the agent can view the application that is displayed at first screen 410 using second screen 420. While the illustrated embodiment of FIG. 4 illustrates two screens that are involved in a peer-to-peer screen sharing session, in alternate embodiments, additional screens can be involved in a peer-to-peer screen sharing session. In these alternate embodiments, the application that is displayed at first screen 410 can be viewed using each additional screen.

According to an embodiment, a display of first screen 410, which includes a display of the application, is captured by a screen capture module 430. Screen capture module 430 is a module that can be automatically (or manually) downloaded to a computer of the customer (not shown in FIG. 4), where the computer is operatively coupled to first screen 410. According to the embodiment, screen capture module 430 can capture the display of first screen 410 into a multimedia format 440.

Screen capture module 430 can mask any components of the application that are identified with an indication that the components are to be masked, as previously described in relation to FIGS. 2 and 3, in accordance with an embodiment. In the embodiment, the masking of the components is performed by the screen capture module 430 at the computer operatively coupled to first screen 410, before multimedia format 440 is transmitted to second screen 420. By performing the masking of the components before multimedia format 440 is transmitted to second screen 420, the security of the transmission is enhanced. In an alternate embodiment, the masking of the components is performed by a computer operatively coupled to second screen 420 (not shown in FIG. 4), after multimedia format 440 is transmitted to second screen 420.

A multimedia format, as understood by one of ordinary skill in the art, is a data format, such as a computer file or data stream, for storing and transmitting multimedia data. An example of a multimedia format is a set of image files that utilize an image format, such as a Joint Photographic Experts Group ("JPEG") format, a Graphics Interchange Format ("GIF"), and a Portable Network Graphics ("PNG") format. Another example of a multimedia format is a video file that utilizes a video format, such as a Flash Video format and a Moving Pictures Experts Group ("MPEG") format. In these examples, a viewer at the computer of the agent (not shown in FIG. 4) can access the file and display the set of images files, or video file, at second screen 420. Yet another example of a multimedia format is a streaming protocol, such as a Real Time Streaming Protocol ("RTSP"), a Real Time Transport Protocol ("RTTP"), a Real Time Transport Control Protocol ("RTCP"), and a Real Time Messaging Protocol ("RTMP"). In this example, a player at the computer of the agent (not shown in FIG. 4) can subscribe to the stream and display the stream at second screen 420.

According to the embodiment, after the display of first screen 410 is captured into multimedia format 440, multimedia format 440 is transmitted to second screen 420 over a direct data connection. More specifically, multimedia format 440 is transmitted directly from the computer operatively coupled to first screen 410 (not shown in FIG. 4) over a data connection to the computer operatively coupled to second screen 420 (also not shown in FIG. 4). Multimedia format 440 is then displayed on second screen 420. The peer-to-peer model can be utilized, in one embodiment, when the computer operatively coupled to first screen 410 and the computer operatively coupled to second screen 420 are part of a common network, and there are no firewalls between the two computers.

Figure 5:
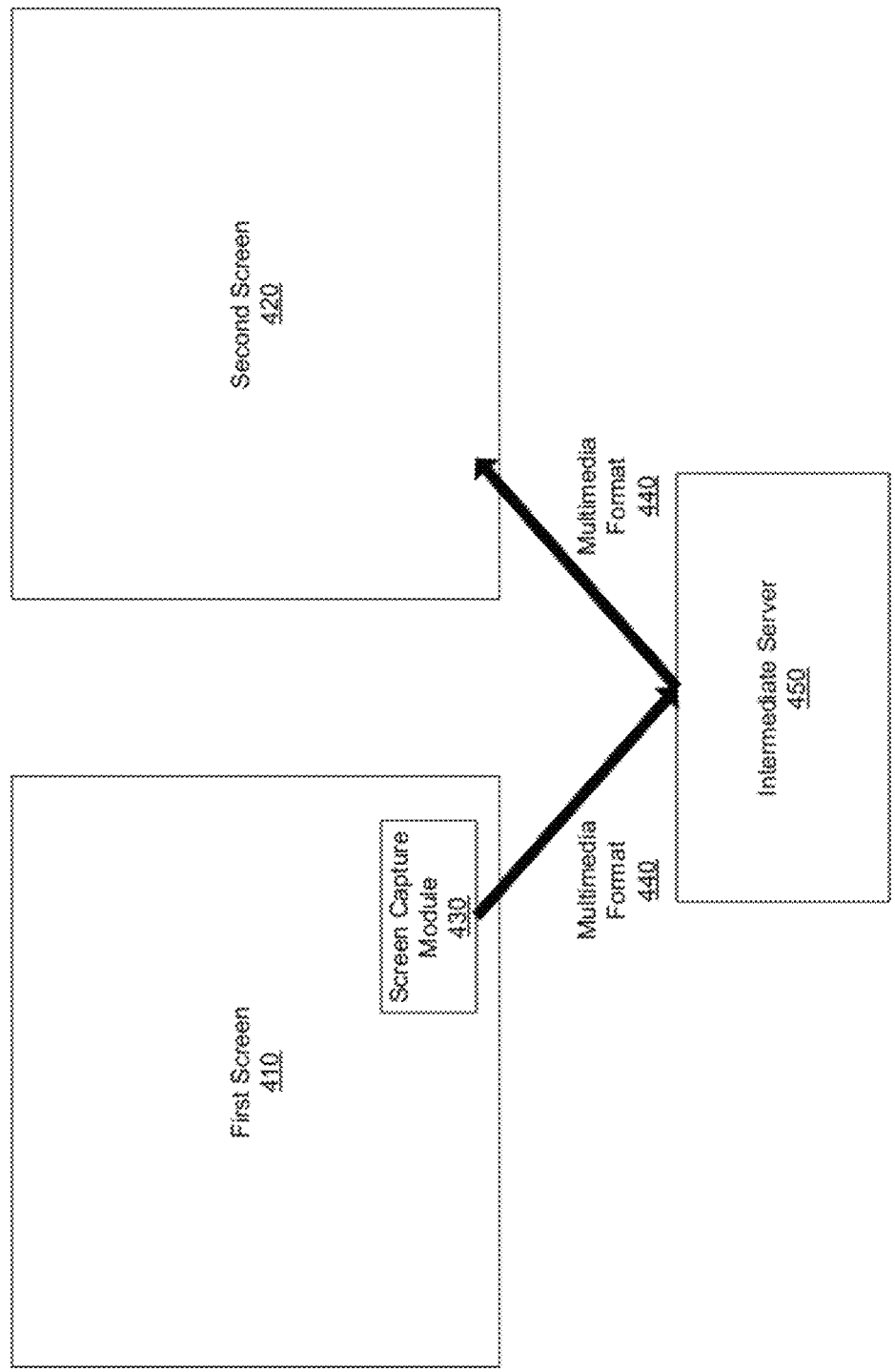
FIG. 5 illustrates a screen sharing session utilizing an intermediary server according to an embodiment of the invention.

FIG. 5 illustrates a screen sharing session utilizing an intermediary server according to an embodiment of the invention. The illustrated embodiment of FIG. 5 is identical to the illustrated embodiment of FIG. 4, except for the following differences, which will be described in detail. Rather than using a direct data connection to transmit multimedia format 440 from first screen 410 to second screen 420, multimedia format 440 is transmitted to second screen 420 using an indirect data connection. More specifically, multimedia format 440 is transmitted from a computer operatively coupled to first screen 410 (not shown in FIG. 5) over a first data connection to intermediate server 450. Intermediate server 450 can be any server known to one of ordinary skill in the art, such as an image update server or a video streaming server. Subsequently, multimedia format 440 is transmitted from intermediate server 450 over a second data connection to a computer operatively coupled to second screen 420 (not shown in FIG. 5). While the illustrated embodiment of FIG. 5 illustrates two screens that are involved in a screen sharing session utilizing an intermediary server, in alternate embodiments, additional screens can be involved in screen sharing session utilizing an intermediary server. In these alternate embodiments, multimedia format 440 can be transmitted from intermediate server 450 over additional data connections to a computer operatively coupled to each additional screen (not shown in FIG. 5).

Furthermore, similar to the illustrated embodiment of FIG. 4, the masking can be performed by screen capture module 430 (before multimedia format 440 is transmitted to intermediate server 450), or be performed by the computer operatively coupled to second screen 420 (after multimedia format 440 has been transmitted to both intermediate server 450 and the computer operatively coupled to second screen 420). However, in one embodiment, the masking can be performed in an alternate manner; namely, the masking can be performed by intermediate server 450. In this embodiment, masking of any components of an application displayed in first screen 410, where the components are identified with an indication that the components are to be masked, can be performed at intermediate server 450, after multimedia format 440 is transmitted to intermediate server 450, but before multimedia format 440 is transmitted to the computer operatively coupled to second screen 420. According to the embodiment, the masking is performed as previously described in relation to FIGS. 2 and 3.

According to an embodiment where identifying a component of an application to be masked with an indication comprises setting a border of the component to a color, masking the component can comprise properly determining the border of the component, in order to correctly mask the component. In most cases, the entire region of the component to be masked is visible, and determining the border of the component is straightforward. However, in certain cases, the entire region of the component to be masked is not visible. For example, a display of an application may be minimized so that only a portion of the application may be displayed on the screen, and a portion of the region of the component to be masked is not displayed on the screen. As another example, a separate application may be superimposed over the original application and may obscure a portion of the region of the component to be masked. This poses a risk that the entire region will not be correctly masked.

According to the embodiment, in order to address this scenario, a screen capture module (such as screen capture module 16 of FIG. 1) can determine a masking border by searching for visible corners of the masking border. Once the screen capture module locates a first visible corner, the screen capture module can trace the colored masking border in a horizontal direction, a vertical direction, or both directions, extending from the first visible corner until the screen capture module detects a color change in the display.

If the location of the color change is a second corner of the masking border, then the screen capture module can trace the masking border in a new horizontal direction, a new vertical direction, or both new directions, extending from the second visible corner until the screen capture module again detects a color change in the display, or until the screen capture module completes the trace of the masking border.

However, if the location of the color change is before a second visible corner is reached, then the screen capture module can assume that the next corner is obscured from view (by either the scrollable area of the application window or by another application window), and can insert a corner of the appropriate orientation within the masking border.

After inserting a corner within the masking border, the screen capture module then traces a new masking border by inserting a masking border in a horizontal direction, a vertical direction, or both directions, extending from the inserted corner. The screen capture module can insert the masked border in the horizontal direction, vertical direction, or both directions, extending from the inserted corner until the screen capture module completes the trace of the masking border. Once the screen capture module completes the trace based on a first visible corner, the screen capture module can begin a trace using a second visible corner, if there is a second visible corner. The screen capture module can complete the trace for each visible corner, thus tracing the complete masking border.

This method only requires that one corner of the masking border be visible at any time. Of course, more corners of the masking border may be visible, and the screen capture module can complete the masking border by adding appropriate edges as described above.

Embodiments of the invention that utilize a masking border will now be described in greater detail in relation to FIGS. 6 and 7.

Figure 6:
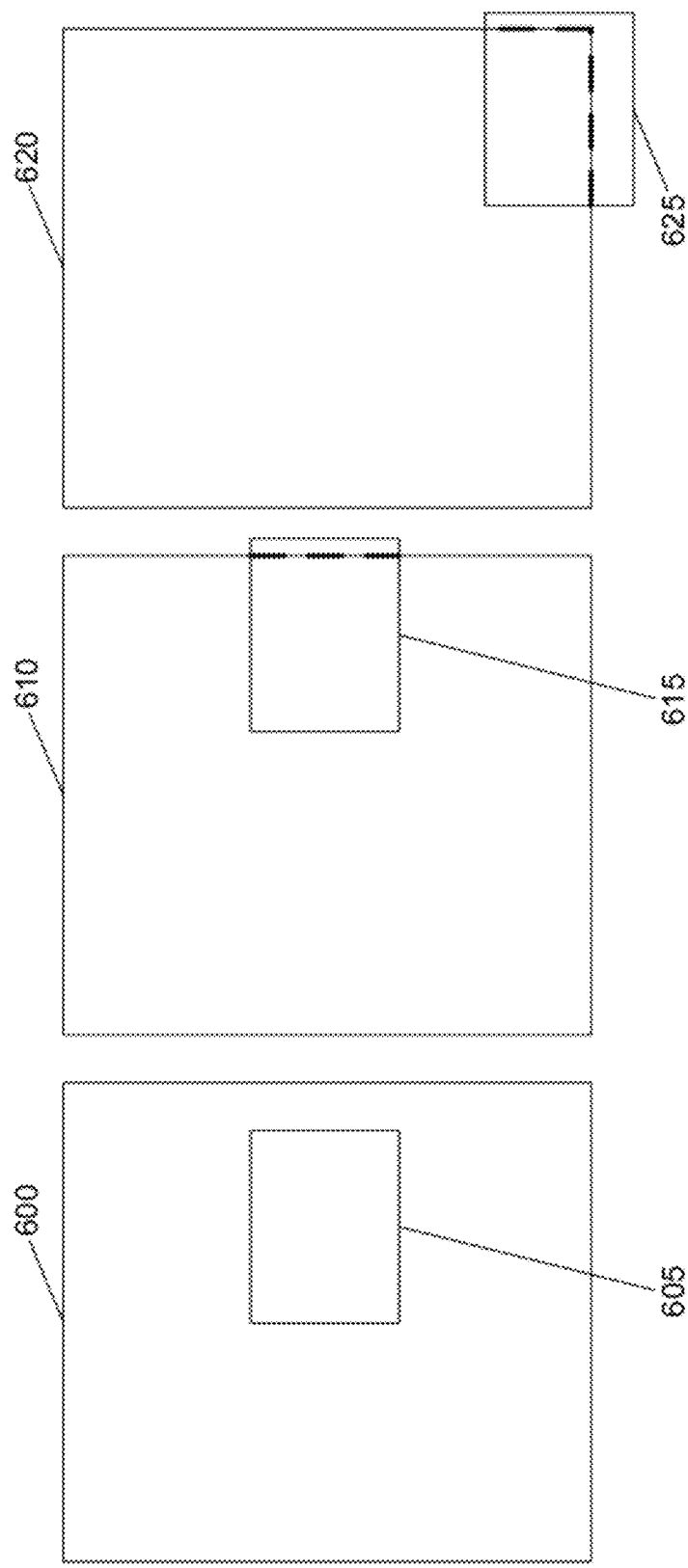
FIG. 6 illustrates examples of masking borders according to an embodiment of the invention.

FIG. 6 illustrates examples of masking borders according to an embodiment of the invention. More specifically, FIG. 6 illustrates applications 600, 610, and 620. Applications 600, 610, and 620 are each an application that is displayed on a screen according to an embodiment of the invention. Application 600 includes a component to be masked that is surrounded by masking border 605. The entire region of the component to be masked (i.e., the entire region formed by masking border 605) is visible on the screen, and thus, no completion of masking border 605 is required.

Similar to application 600, application 610 includes a component to be masked that is surrounded by masking border 615. However, the entire region formed by masking border 615 is not visible on the screen because a portion of the region is outside the displayed region of application 610. This can be due to the fact that application 610 is minimized. According to the embodiment, a screen capture module (such as screen capture module 16 of FIG. 1) searches and locates the visible corners of masking border 615 (i.e., the upper and lower left corners of masking border 615), traces masking border 615 in horizontal and vertical directions extending from the visible corners, inserts the missing corners, and inserts the missing masking border extending from the inserted corners to complete masking border 615, where the inserted corners and inserted masking border are indicated by the dashed line of masking border 615 in FIG. 6.

Similar to application 610, application 620 includes a component to be masked that is surrounded by masking border 625, where the entire region formed by masking border 625 is not visible on the screen because a portion of the region is outside the displayed region of application 620. However, in contrast to application 610, only one corner of masking border 625 (i.e., the upper left corner) is visible, rather than two corners. Nevertheless, according to the embodiment, the screen capture module searches and locates the visible corner of masking border 625, traces masking border 625 in horizontal and vertical directions extending from the visible corner, inserts the missing corners, and inserts the missing masking border extending from the inserted corners to complete masking border 625, where the inserted corners and inserted masking border are indicated by the dashed lines of masking border 625 in FIG. 6.

FIG. 7 illustrates additional examples of masking borders according to an embodiment of the invention. More specifically, FIG. 7 illustrates applications 700 and 710. Applications 700 and 710 are each an application that is displayed on a screen according to an embodiment of the invention. Application 700 includes a component to be masked that is surrounded by masking border 705. However, the entire region formed by masking border 705 is not visible on the screen because application 706 is superimposed over application 700 and obscures a portion of the region formed by masking border 705. As the region of masking border 705 that is visible on the screen has an irregular shape, as compared to the embodiments illustrated in FIG. 6, this is a more challenging completion problem than the completion problems described in relation to FIG. 6. Nevertheless, according to an embodiment, a screen capture module (such as screen capture module 16 of FIG. 1) searches and locates the visible corners of masking border 705 (i.e., the lower left, upper right, and lower right corners of masking border 705), traces masking border 705 in horizontal and vertical directions extending from the visible corners, inserts the missing corners, and inserts the missing masking border extending from the inserted corners to complete masking border 705, where the inserted corners and inserted masking border are indicated by the dashed lines of masking border 705 in FIG. 7.

Similar to application 700, application 710 includes a component to be masked that is surrounded by masking border 715, where the entire region formed by masking border 715 is not visible on the screen. In contrast to application 710, this is because two applications (i.e., applications 716 and 717) are superimposed over application 700, and the two applications obscure a portion of the region formed by masking border 715. Similar to application 710, according to an embodiment, the screen capture module searches and locates the visible corners of masking border 715 (i.e., the lower left, upper right, and lower right corners of masking border 705), traces masking border 715 in horizontal and vertical directions extending from the visible corners, inserts the missing corners, and inserts the missing masking border extending from the inserted corners to complete masking border 715, where the inserted corners and inserted masking border are indicated by the dashed lines of masking border 715 in FIG. 7.

Figure 8:
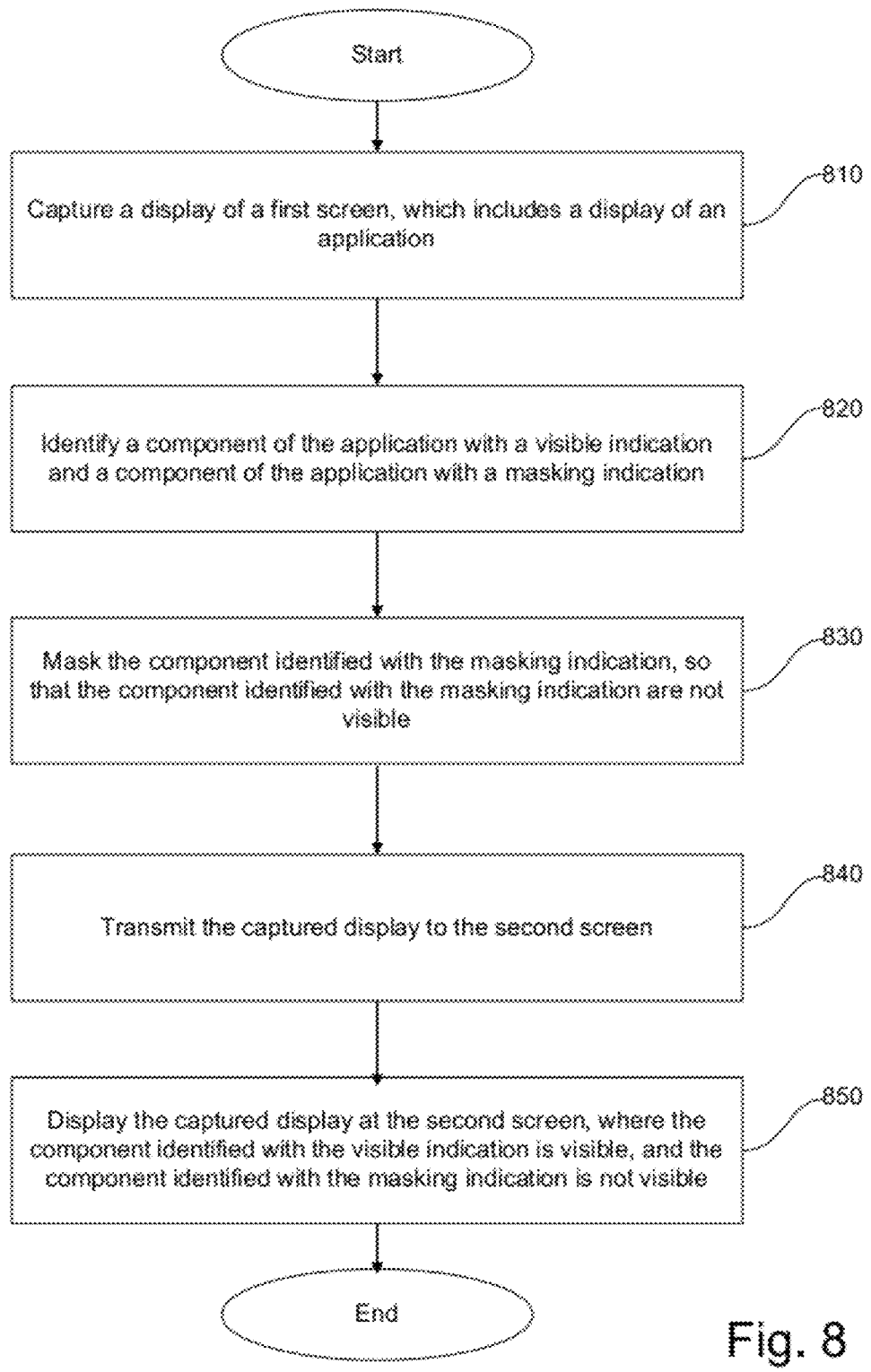
FIG. 8 illustrates a flow diagram of the functionality of a screen capture module according to an embodiment of the invention.

FIG. 8 illustrates a flow diagram of the functionality of a screen capture module according to an embodiment of the invention. In one embodiment, the functionality of the flow diagram of FIG. 8 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 810, a display of a first screen, which includes a display of an application, is captured. In one embodiment, the captured display includes a multimedia format that includes one or more images. In an alternate embodiment, the captured display includes a multimedia format that includes a video.

At 820, a component of the application is identified with a visible indication, and a component of the application is identified with a masking indication, where the application is displayed on a first screen. In an embodiment, there is no identification of a component of the application with a visible indication, and there is only an identification of a component of the application with a masking indication. In one embodiment, a border of the component identified with a visible indication is set to a visible color, and a border of the component identified with a masking indication is set to a masking color. In an embodiment, there is no setting of a border of a component identified with a visible indication to a visible color, and there is only a setting of a border of a component identified with a masking indication to a masking color.

In an embodiment, the setting of the border can first require the determination of the border. A border can be determined by: locating a first visible corner of the border of at least one component that is set to a masking color, tracing the border in a horizontal or vertical direction extending from the first visible corner until a color change is detected in the display, when the location of the color change is at a second visible corner of the border, tracing the border in a new horizontal or vertical direction extending from the second visible corner, and when the location of the color change is not at a second visible corner of the border, inserting a corner at the location of the color change and tracing a new masking border by inserting a masking border in a horizontal direction or vertical direction extending from the inserted corner.

In an embodiment, an application is a web page. When an application is a web page, a document object model of the web page can be analyzed, and it can be determined whether each component of the web page should be displayed or masked during a screen sharing session. According to the embodiment, a style sheet of the web page can be dynamically modified to identify the component to be displayed during the screen sharing session with the visible indication, and to identify the component to be masked during the screen sharing session with the masking indication. In one embodiment, there is no dynamic modification of a style sheet of the web page to identify the component to be displayed during the screen sharing session with the visible indication, and there is only a dynamic modification of a style sheet of the web page to identify the component to be masked during the screen sharing session with the masking indication.

In an alternate embodiment, an application is a software application. When an application is a software application, source code of the software application can be analyzed, and it can be determined whether each component of the software application should be displayed or masked during a screen sharing session. According to the embodiment, one or more attributes of the software application can be dynamically modified to identify the component to be displayed during a screen sharing session with a visible indication, and to identify the component to be masked during the screen sharing session with a masking indication. In one embodiment, there is no dynamic modification of one or more attributes of the software application to identify the component to be displayed during a screen sharing session with a visible indication, and there is only a dynamic modification of one or more attributes of the software application to identify the component to be masked during the screen sharing session with a masking indication.

At 830, the component of the application identified with the masking indication is masked, so that the component of the application identified with the masking indication is not visible. In an embodiment, the component of the application identified with the masking indication is masked by replacing the component identified with the masking indication with at least one of a solid color and a pattern. In an alternate embodiment, the component of the application identified with the masking indication is masked by changing content, such as text, in the component identified with the masking indication to match a color of a background color of the component.

At 840, the captured display is transmitted to a second screen. In one embodiment, the captured display is transmitted to the second screen over a direct connection. In an alternate embodiment, the captured display is first transmitted to an intermediate server, and then the captured display is transmitted, by the intermediate server, to the second screen. In alternate embodiments, the captured display is transmitted to any number of additional screens.

At 850, the captured display is displayed at the second screen. The component of the application identified with the visible indication is visible in the captured display displayed at the second screen. The component of the application identified with the masking indication is not visible in the captured display displayed at the second screen. In an embodiment where there is no component of the application identified with the visible indication, the component of the application identified with the masking indication is not visible in the captured display displayed at the second screen. In alternate embodiments, the captured display is displayed at any number of additional screens.

In one embodiment, utilizing either a direct connection or an intermediate server, the masking is performed at a computer operatively coupled to the first screen, and the masking is performed before the capturing and the transmitting are performed. In another embodiment, also utilizing either a direct connection or an intermediate server, the masking is performed at a computer operatively coupled to the second screen, and the masking is performed after the capturing and the transmitting is performed. In an alternate embodiment utilizing an intermediate server, the masking is performed at the intermediary server, and the masking is performed before the capturing and the transmitting the captured display to the intermediate server are performed, but before the transmitting the captured display to the second screen is performed.

Thus, according to an embodiment, a screen sharing session can be provided utilizing two screens where specific components of an application may be masked and thus, hidden from view. In accordance with the embodiment, the masking can be customized within a display of an application, rather than an all-or-nothing display of the application. Thus, a customer service agent can provide direct assistance to a customer of an application, utilizing a screen sharing session, yet the confidentiality of sensitive information of the customer, that displayed in the application, can be preserved.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to mask components of an application displayed during a screen sharing session, the masking comprising:

displaying a first application and a second application on a first screen, the first application including a first component having a predefined region enclosed by a border, the second application including a second component having a predefined region enclosed by a border, the predefined region of the first component obscuring a portion of the predefined region of the second component such that a portion of the first component border defines a common boundary between the predefined region of the first component and the predefined region of the second component;

capturing the display of the first screen to create a captured display;

determining that the first component should be displayed on a second screen during a screen sharing session, and that the second component should be masked on the second screen during the screen sharing session;

identifying the first component with a visible indication by setting a color of the first component border to a first color;

determining a masking border of the second component by adding one or more border segments to a visible portion of the second component border, the one or more border segments extending along the common boundary;

identifying the second component with a masking indication by setting a color of the masking border of the second component to a second color that is different than the first color;

displaying the first component with the first component border of the first color and the second component with the masking border of the second color on the first screen;

masking the second component in the captured display so that the second component is not visible in the captured display; and transmitting the captured display to the second screen.

2. The non-transitory computer-readable medium of claim 1, wherein determining the masking border includes:
locating a first visible corner of the second component border;
tracing the second component border in a horizontal or vertical direction extending from the first visible corner until a color change is detected;
when the location of the color change is at a second visible corner of the second component border, tracing the second component border in a new horizontal or vertical direction extending from the second visible corner; and
when the location of the color change is not at a second visible corner of the second component border, inserting a corner at the location of the color change and tracing a new masking border by inserting a masking border in a horizontal direction or vertical direction extending from the inserted corner.

3. The non-transitory computer-readable medium of claim 1, wherein:
the second application comprises a web page; and
identifying the second component further comprises:
inserting one or more tags within the web page, wherein the one or more tags automatically load source code written in a scripting language; and
dynamically modifying a style sheet of the web page, using the source code, to identify the second component to be masked during the screen sharing session with the masking indication.

4. The non-transitory computer-readable medium of claim 1, wherein:
the second application comprises a software application;
identifying the second component further comprises:
extending an application programming interface of the software application, wherein source code interacts with source code of the software application, and wherein the source code is written in a native language of the software application; and
dynamically modifying one or more attributes of the software application, using the source code, to identify the second component to be masked during the screen sharing session with the masking indication, and
the one or more attributes comprise display properties that define how the component is displayed.

5. The non-transitory computer-readable medium of claim 1, wherein the masking is performed at a computer operatively coupled to the first screen, and wherein the masking is performed before the capturing and the transmitting.

6. The non-transitory computer-readable medium of claim 1, wherein the masking is performed at a computer operatively coupled to the second screen, and wherein the masking is performed after the capturing and the transmitting.

7. The non-transitory computer-readable medium of claim 1, wherein transmitting further comprises transmitting the captured display to the second screen over a direct connection.

8. The non-transitory computer-readable medium of claim 1, wherein the transmitting further comprises:
transmitting the captured display to an intermediary server; and
transmitting, by the intermediary server, the captured display to the second screen.

9. The non-transitory computer-readable medium of claim 8, wherein the masking is performed at the intermediary server, and wherein the masking is performed before the capturing and the transmitting the captured display to the intermediate server but before the transmitting the captured display to the second screen.

10. The non-transitory computer-readable medium of claim 1, wherein setting the color of the first component border does not change the color of the first component predefined region, and setting the color of the second component masking border does not change the color of the second component predefined region.

11. A computer-implemented method for masking components of an application displayed during a screen sharing session, the method comprising:
displaying a first application and a second application on a first screen, the first application including a first component having a predefined region enclosed by a border, the second application including a second component having a predefined region enclosed by a border, the predefined region of the first component obscuring a portion of the predefined region of the second component such that a portion of the first component border defines a common boundary between the predefined region of the first component and the predefined region of the second component;
capturing the display of the first screen to create a captured display;
determining that the first component should be displayed on a second screen during a screen sharing session, and that the second component should be masked on the second screen during the screen sharing session;
identifying the first component with a visible indication by setting a color of the first component border to a first color;
determining a masking border of the second component by adding one or more border segments to a visible portion of the second component border, the one or more border segments extending along the common boundary;
identifying the second component with a masking indication by setting a color of the masking border of the second component to a second color that is different than the first color;
displaying the first component with the first component border of the first color and the second component with the masking border of the second color on the first screen;
masking the second component in the captured display so that the second component is not visible in the captured display; and
transmitting the captured display to the second screen.

12. The computer-implemented method of claim 11, wherein determining the masking border includes:
locating a first visible corner of the border of the second component;
tracing the border in a horizontal or vertical direction until a color change is detected;
when the location of the color change is at a second visible corner of the second component border, tracing the border in a new horizontal or vertical direction based on the second visible corner; and
when the location of the color change is not at a second visible corner of the second component border, inserting a corner at the location of the color change.

13. The computer-implemented method of claim 11, wherein:
   the second application comprises a web page; and
   identifying the second component further comprises:
      inserting one or more tags within the web page, wherein the one or more tags automatically load source code written in a scripting language; and
      dynamically modifying a style sheet of the web page, using the source code, to identify the second component to be masked during the screen sharing session with the masking indication.

14. The computer-implemented method of claim 11, wherein:
   the second application comprises a software application;
   identifying the second component further comprises:
      extending an application programming interface of the software application, wherein source code interacts with source code of the software application, and wherein the source code is written in a native language of the software application; and
      dynamically modifying one or more attributes of the software application, using the source code, to identify the second component during the screen sharing session with the masking indication, and
   the one or more attributes comprise display properties that define how the component is displayed.

15. The computer-implemented method of claim 11, wherein setting the color of the first component border does not change the color of the first component predefined region, and setting the color of the second component masking border does not change the color of the second component predefined region.

16. A system, comprising:
   a remote computer, coupled to a network, including a display screen, a memory and a processor coupled to the display screen and the memory; and
   a local computer, coupled to the network, including a display screen, a memory storing a screen capture module, and a processor coupled to the display screen and the memory, the processor, when executing the screen capture module, is adapted to mask components of an application displayed during a screen sharing session, the masking comprising:
      displaying a first application and a second application on the local computer display screen, the first application including a first component having a predefined region enclosed by a border, the second application including a second component having a predefined region enclosed by a border, the predefined region of the first component obscuring a portion of the predefined region of the second component such that a portion of the first component border defines a common boundary between the predefined region of the first component and the predefined region of the second component;
      capturing the display of the local computer display screen to create a captured display;
      determining that the first component should be displayed on the remote display screen during a screen sharing session, and that the second component should be masked on the remote computer display screen during the screen sharing session;
      identifying the first component with a visible indication by setting a color of the first component border to a first color;
      determining a masking border of the second component by adding one or more border segments to a visible portion of the second component border, the one or more border segments extending along the common boundary;
      identifying the second component with a masking indication by setting a color of the masking border of the second component to a second color that is different than the first color;
      displaying the first component with the first component border of the first color and the second component with the masking border of the second color on the local computer display screen;
      masking the second component in the captured display so that the second component is not visible in the captured display; and
      transmitting the captured display to the remote computer display screen.

17. The system of claim 16, wherein determining the masking border includes:
   locating a first visible corner of the second component border;
   tracing the second component border in a horizontal or vertical direction extending from the first visible corner until a color change is detected;
   when the location of the color change is at a second visible corner of the second component border, tracing the second component border in a new horizontal or vertical direction extending from the second visible corner; and
   when the location of the color change is not at a second visible corner of the second component border, inserting a corner at the location of the color change and tracing a new masking border by inserting a masking border in a horizontal direction or vertical direction extending from the inserted corner.

18. The system of claim 16, wherein, prior to masking the second component, the local computer transmits the captured display to the remote computer, which masks the second component so that the second component is not visible when displayed on the remote computer display screen.

19. The system of claim 16, further comprising:
   an intermediary server coupled to the network,
   wherein, prior to masking the second component, the local computer transmits the captured display to the intermediate server, which masks the second component so that the second component is not visible when displayed on the remote computer display screen, and transmits the captured display to the remote computer.

20. The system of claim 16, wherein setting the color of the first component border does not change the color of the first component predefined region, and setting the color of the second component masking border does not change the color of the second component predefined region.

* * * * *